(12) United States Patent
Yeo

(10) Patent No.: US 6,656,086 B2
(45) Date of Patent: Dec. 2, 2003

(54) SHIFT CONTROL METHOD FOR AN AUTOMATIC TRANSMISSION OF A VEHICLE

(75) Inventor: Chang-Gi Yeo, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/995,625

(22) Filed: Nov. 29, 2001

(65) Prior Publication Data

US 2002/0065167 A1 May 30, 2002

(30) Foreign Application Priority Data

Nov. 30, 2000 (KR) ................................ 2000-0071895
Jun. 12, 2001 (KR) ................................ 2001-0032822

(51) Int. Cl.$^7$ ............................................. F16H 59/60
(52) U.S. Cl. ...................... 477/97; 477/902; 477/905
(58) Field of Search ...................... 477/97, 117, 121, 477/141, 144, 159, 902, 905

(56) References Cited

U.S. PATENT DOCUMENTS

| | | | |
|---|---|---|---|
| 5,025,685 A | * | 6/1991 | Kobayashi et al. ........... 477/97 |
| 5,117,711 A | * | 6/1992 | Iizuka ........................ 477/121 |
| 5,269,203 A | | 12/1993 | Ueda |
| 5,319,555 A | * | 6/1994 | Iwaki et al. ............ 477/902 X |
| 5,323,668 A | * | 6/1994 | Nakagawa et al. ..... 477/905 X |
| 5,484,350 A | | 1/1996 | Ishikawa et al. |
| 5,501,644 A | * | 3/1996 | Zhang ........................ 477/97 |
| 6,006,150 A | * | 12/1999 | Ueda ........................ 477/78 X |

FOREIGN PATENT DOCUMENTS

EP 0 730 110 B1 9/2001

* cited by examiner

Primary Examiner—Roger Pang
(74) Attorney, Agent, or Firm—Birch, Stewart, Kolasch & Birch, LLP

(57) ABSTRACT

In order to consider a vehicle driving altitude in a shift control method, an atmospheric pressure is detected, values of shift control variables are reset based on the detected atmospheric pressure when a predetermined atmospheric pressure applying condition is satisfied, and shifting is controlled on the basis of the reset values of the shift control variables.

7 Claims, 5 Drawing Sheets

SHIFT CONTROL METHOD FOR AN AUTOMATIC TRANSMISSION OF A VEHICLE

CROSS-REFERENCE TO RELATED APPLICATION

This application claims priorities of Korea patent Application No. 10-2000-0071895, filed on Nov. 30, 2000, and Korea patent Application No. 10-2001-0032822, filed on Jun. 12, 2001.

BACKGROUND OF THE INVENTION (a) Field of the Invention

The present invention relates to a shift control method for an automatic transmission of a vehicle, and more particularly, to a shift control method for an automatic transmission for re-setting values of shift-control-variables according to an altitude of the vehicle driving.

(b) Description of the Related Art

Generally, an automatic transmission is exposed to various driving conditions. A transmission control unit determines a most preferable shift-speed under the driving conditions and performs a speed shift to the determined shift-speed.

Whether a speed shift to a target shift-speed is necessary is determined based on a shift-pattern, which includes an upward shift-pattern for determining that an upward shift is necessary and a downward shift-pattern for determining that a downward shift is necessary. As examples of the upward shift-pattern and the downward shift pattern, FIG. 1 shows the upward and downward shift-patterns between a second and a third shift-speed.

Each of the 3→2 and 2→3 shift-patterns forms a line. When a driving-state determined by a vehicle speed Vs and a throttle valve open-angle TH crosses over the 3→2 shift-pattern, a speed shift to the second speed is necessary if the third shift-speed is currently engaged. When a driving-state crosses over the 2→3 shift-pattern, a speed shift to the third speed is necessary if the second shift-speed is currently engaged.

Therefore, when the driving-state is to the right of the 2→3 shift-pattern, the third shift-speed is engaged, and when the driving-state is to the left of the 3→2 shift-pattern, the second shift-speed is engaged. When the driving-state is between the 3→2 and 2→3 shift-patterns, a target shift-speed is determined based on a hysteresis of the driving-state change.

When the driving state of the vehicle currently corresponds to a point A of FIG. 1, the driving state is changed to a point B if the throttle valve open-angle TH is reduced as an accelerator pedal is released. In this case, a speed shift to the third speed begins if the vehicle is currently running in the second shift-speed. This kind of speed shift, an upward speed shift caused by the throttle valve open-angle being reduced, is called a lift-foot-up shift (referred to as "LFU" hereinafter).

To the contrary, when the driving state of the vehicle currently corresponds to a point C, the driving state is changed to a point D if the throttle valve open angle TH is increased as the accelerator pedal is depressed. In this case, a speed shift to the second speed begins if the vehicle is currently running in the third shift-speed. This kind of speed shift, a downward speed shift caused by the throttle valve open-angle being increased, is called a kick-down shift.

The upward shift-pattern is usually modified when the vehicle is running on a slope in order to hold the shift-speed in a lower one such that sufficient engine power can be utilized. Modification factors used for modifying the shift-pattern are determined on the basis of the slope.

FIG. 2A shows an example of the modification factors, and FIG. 2B shows an upward shift-pattern modified under the modification factors.

As shown in FIG. 2A, the modification factors include a modification limit RSU for defining a maximum amount of modification, a minimum slope RS0 for modifying the shift-pattern, and a maximum slope RS1 at which the shift-pattern is modified by the modification limit RSU.

That is, the shift-pattern is not modified when the slope of a road is less than the minimum slope RS0, the shift-pattern is modified by the modification limit RSU when the slope is larger than the maximum slope RS1, and the shift pattern is modified increasingly as the slope increases when the slope is between the minimum and maximum slopes RS0 and RS1.

The solid line 210 of FIG. 2B denotes a 2→3 shift-pattern for a level road, and the dotted line 220 denotes a modified 2→3 shift-pattern on a slope. When the slope is larger than the minimum slope RS0, the shift-pattern is modified in a rightward direction in FIG. 2B, and the amount of the modification increases as the slope increases.

According to the modified shift-pattern 220, a lift-foot-up shift is prohibited even if the vehicle driving state is changed from the point A to the point B by releasing the accelerator pedal.

A shift control method for a kick-down shift is described hereinafter with an example of 3→2 kick-down shift. A friction element for operating in the third shift-speed (referred to as "release-element" hereinafter) is released during a 3→2 kick-down shift-control, and a friction element for operating in the second shift-speed (referred to as "apply-element" hereinafter) is controlled to engage during the 3→2 kick-down shift-control.

For those operations, hydraulic pressure being supplied to the release-element in the third shift-speed is released and hydraulic pressure is newly supplied to the apply-element, which is realized by controlling solenoid valves included in a hydraulic circuit for controlling hydraulic fluid supply. An example of a duty map of the solenoid valves for releasing the release-element and for engaging the apply-element is shown in FIG. 3.

Lines 310 and 320 respectively represent a release duty and an engaging duty, the release duty denoting the duty for releasing hydraulic pressure of the release-element, the engaging duty denoting the duty for supplying hydraulic pressure to the apply-element.

Control variables for hydraulic pressure release of the release-element include an initial release-duty Dsr for suddenly lowering the duty for hydraulic pressure supplied to the release-element, a ramp-control slope dDr for gradually decreasing the release duty for the release-element from the initial release-duty Dsr, and a high-holding duty Dcr for holding the duty at a higher lever than the duty at an end of the ramp-controlling.

Control variables for hydraulic pressure supply to the apply-element include a low-holding duty Da for holding a low level pressure to reduce an engaging shock of the apply-element, and a transition duty De for supplying sufficient hydraulic pressure to prevent slip of the apply-element.

The density of the air that comes into the engine changes according to the altitude of vehicle driving, which causes changes in engine power. However the prior art does not take the altitude into account in a shift control method for an automatic transmission of a vehicle, especially for a shift control method related to lift-foot-up shift and kick-down shift.

Therefore, there has been a need to provide an effective and appropriate shift control method for appropriately preventing a lift-foot-up shift at a high altitude and for controlling a kick-down shift according to a vehicle driving altitude.

That is, there has been a need to prevent a low atmospheric pressure at a high altitude from causing an operating hydraulic pressure for a speed shift to become relatively high, accordingly to prevent shift shock at high altitude, and to prevent a lift-foot-up shift on a slope at a high altitude, accordingly to have the vehicle provided with sufficient driving force.

SUMMARY OF THE INVENTION

The present invention has been made in an effort to solve the above problem. It is an object of the present invention to provide a shift control method for an automatic transmission for preventing a lift-foot-up shift on a slope and for appropriately controlling a kick-down shift when a vehicle equipped with the automatic transmission is driving at a high altitude.

To achieve the above object, the present invention provides a shift control method for an automatic transmission of a vehicle comprising detecting atmospheric pressure, determining whether a predetermined atmospheric pressure applying condition is satisfied, and resetting values of shift control variables based on the detected atmospheric pressure when the predetermined atmospheric pressure applying, condition is satisfied.

The values of shift control variables are reset to be appropriate for an extant atmospheric pressure range, the extant atmospheric pressure range being selected from a plurality of atmospheric pressure ranges formed on the basis of a plurality of predetermined reference atmospheric pressures.

The shift control method of the present invention further comprises determining whether an upward speed shift is necessary based on the reset values of shift control variables.

The shift control variables of which the values are reset comprise at least one of a modification limit RSU for defining a maximum amount of a modification of an upward shift-pattern, a minimum slope RS0 for modifying the upward shift-pattern, and a maximum slope RS1 at which the upward shift pattern is modified by the modification limit RSU.

The shift control method of the present invention further comprises determining whether a predetermined kick-down shift condition is satisfied, and performing a downshift based on the reset values of shift control variables when the kick-down shift condition is satisfied.

The shift control variables of which the values are reset comprise at least one of an initial release-duty Dsr for suddenly lowering a release duty for hydraulic pressure supplied to a release-element, a ramp-control slope dDr for gradually decreasing the release duty for the release-element from the initial release-duty Dsr, and a high-holding duty Dcr for holding duty at a higher lever than a final duty of the ramp-control.

Furthermore, the shift control variables of which the values are reset further comprise at least one of a low-holding duty Da for holding a low level pressure to reduce an engaging shock of an apply-element, and a transition duty De for supplying sufficient hydraulic pressure to prevent slip of the apply-element.

The atmospheric pressure applying condition includes the automatic transmission not undergoing shifting, and the determining whether the predetermined atmospheric pressure applying condition is satisfied determines that the predetermined atmospheric pressure applying condition is not satisfied if the automatic transmission is undergoing shifting.

The atmospheric pressure applying condition preferably includes a change rate of the throttle valve open-angle being within a predetermined change rate range, and the determining whether the predetermined atmospheric pressure applying condition is satisfied determines that the predetermined atmospheric pressure applying condition is not satisfied if the change rate of the throttle valve open-angle is out of the predetermined change rate range.

The atmospheric pressure applying condition further includes the detected atmospheric pressure not being abnormal; and accordingly the determining whether the predetermined atmospheric pressure applying condition is satisfied determines that the predetermined; atmospheric pressure applying condition is satisfied only if the detected atmospheric pressure is not abnormal, and the determining whether the predetermined atmospheric pressure applying condition is satisfied comprises resetting the detected atmospheric pressure as a predetermined atmospheric pressure if the detected atmospheric pressure is abnormal.

The detected atmospheric pressure can be determined to be abnormal when an error exists in a communication line between a transmission control unit and an atmospheric pressure detector, or when the atmospheric pressure detector is determined to be malfunctioning.

DETAILED DESCRIPTION OF THE PREFERRED EMBODIMENTS

Hereinafter, a preferred embodiment of the present invention will be described in detail with reference to the accompanying drawings.

Figure 1:
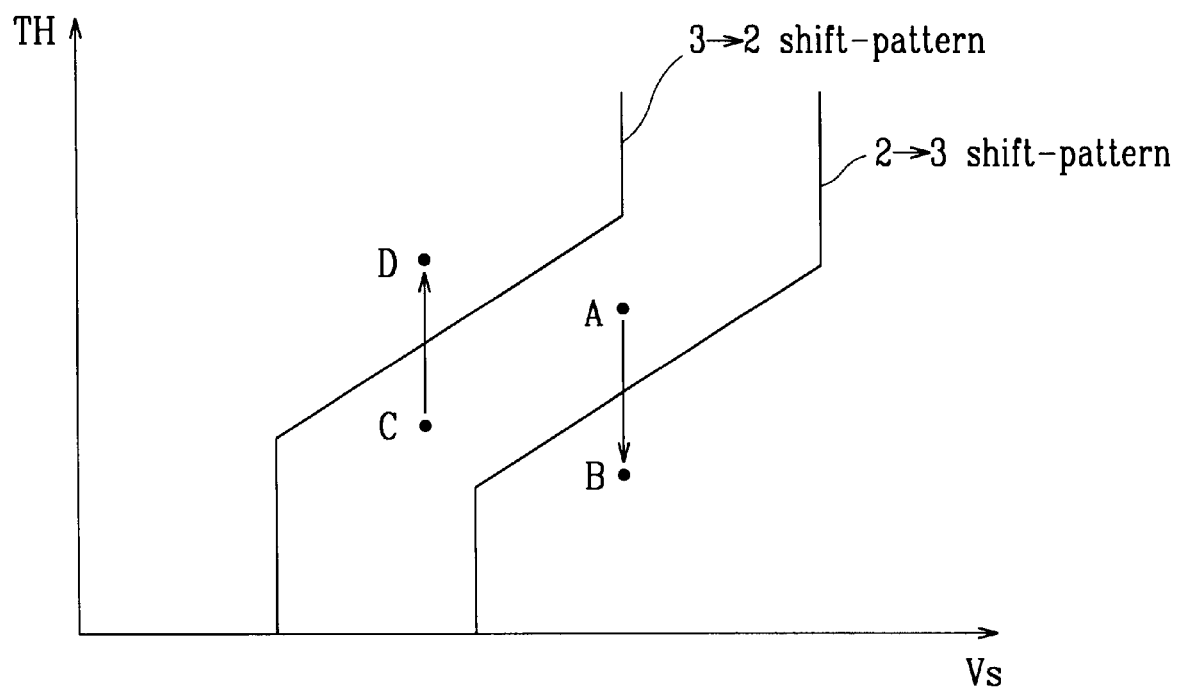
FIG. 1 shows upward and downward shift-patterns between a second and a third shift-speeds, as examples of upward and downward shift patterns.
Figure 2A:
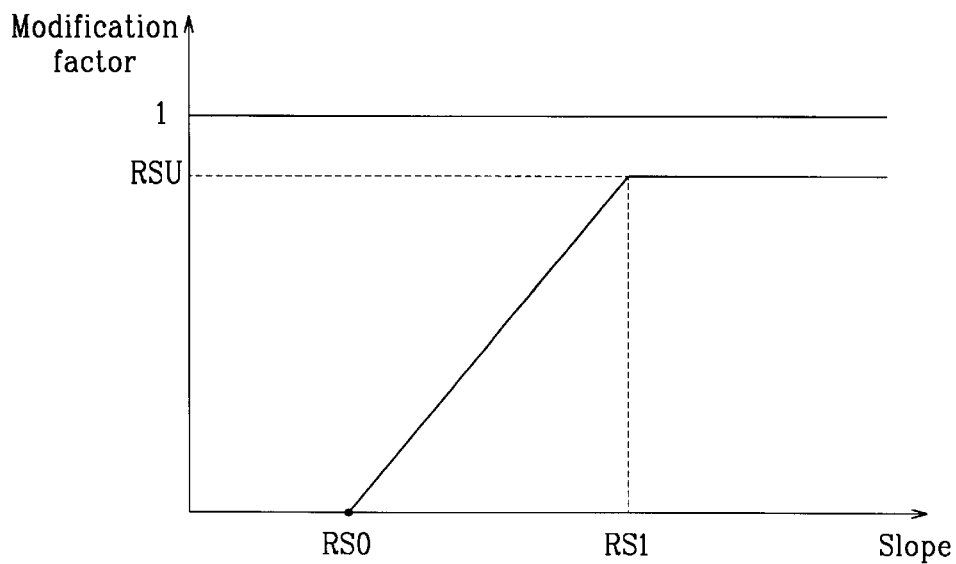
FIG. 2A shows an example of slope dependency of modification factors for being used for modifying a shift-pattern.
Figure 2B:
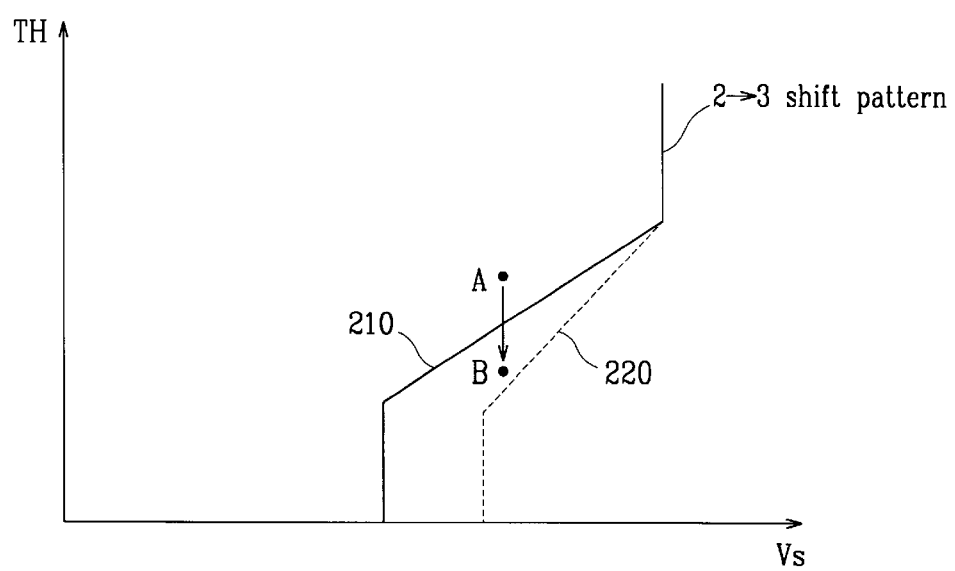
FIG. 2B shows an example of an upward shift-pattern modified under the modification factors.
Figure 3:
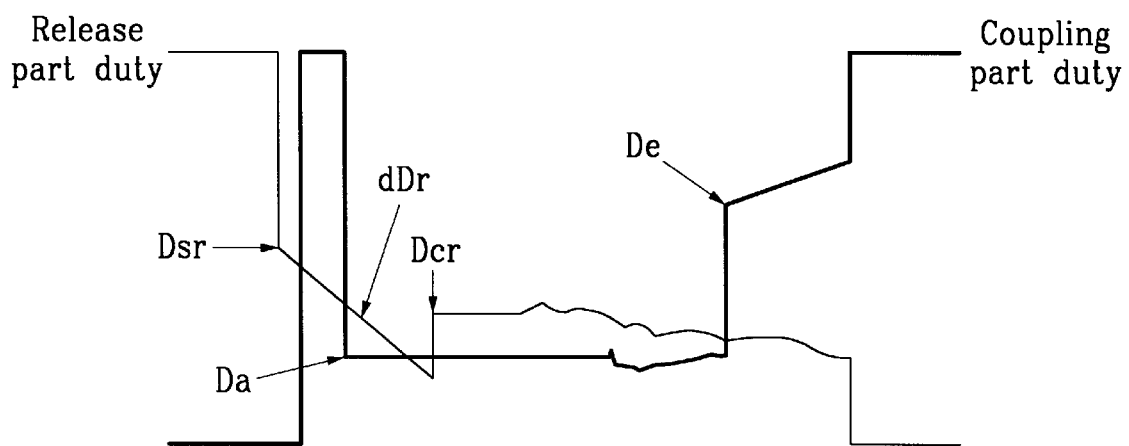
FIG. 3 is an example of a duty map of solenoid valves for releasing a release-element and for engaging an apply-element.
Figure 4:
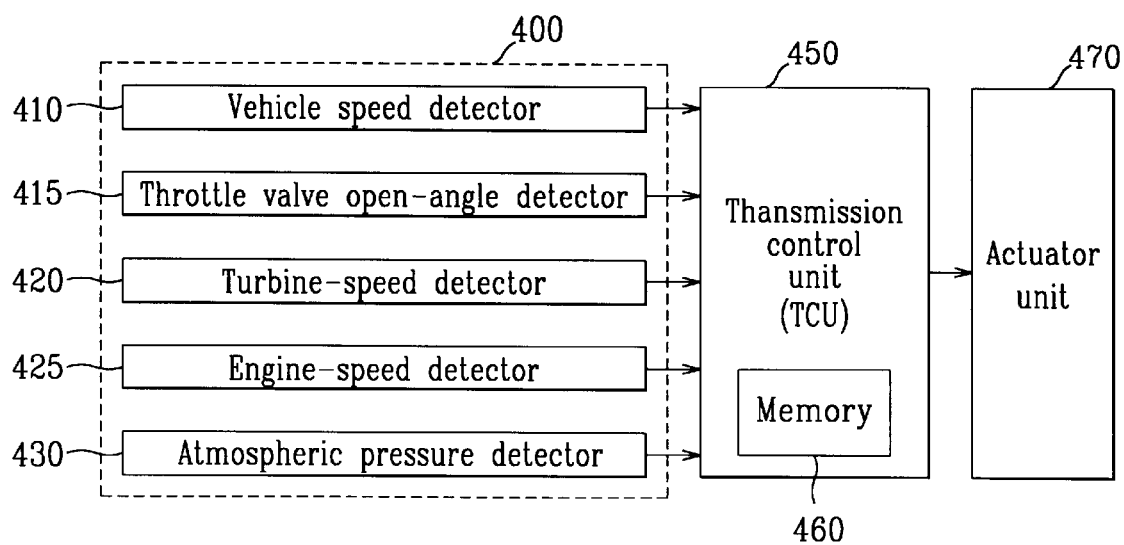
FIG. 4 is a block diagram of a shift control apparatus in which a shift control method according to a preferred embodiment of the present invention is performed.

FIG. 4 is a block diagram of a shift control apparatus in which a shift control method according to a preferred embodiment of the present invention is performed.

As shown in FIG. 4, the shift control apparatus according to a preferred embodiment of the present invention includes a driving-state detecting unit 400 for detecting a plurality of driving-state factors of a vehicle equipped with an automatic transmission such as vehicle speed and throttle valve open-angle, a transmission control unit 450 (referred to as "TCU" hereinafter) for receiving the detected driving-state factors from the driving-state detecting unit 400 and for controlling a speed shift of the automatic transmission based on the received driving-state factors, and an actuator unit 470 disposed in the automatic transmission for performing a speed shift according to control signals received from the TCU 450.

The driving-state detecting unit 400 includes a vehicle speed detector 410 for detecting a vehicle speed, a throttle valve open-angle detector 415 for detecting an open-angle of a throttle valve, a turbine-speed detector 420 for detecting a revolution speed of a turbine disposed in a torque converter of the automatic transmission, an engine-speed detector 425 for detecting a revolution speed of an engine of the vehicle, and an atmospheric pressure detector 430 for detecting atmospheric pressure at the altitude at which the vehicle is driving.

The atmospheric pressure detector 430 can be realized by a sensor disposed outside of the engine for directly detecting atmospheric pressure. As for a vehicle that measures an inducted mass of air by a manifold absolute pressure (MAP) method, a MAP sensor used to detect the manifold absolute pressure can be used for the atmospheric pressure detector 430, and an atmospheric pressure can be calculated based on the output signal of the MAP sensor.

The TCU 450 is realized as a microprocessor activated by a predetermined program, and includes a memory 460 to store variable values to be used for speed shifts.

More particularly, the memory 460 stores variable values including a modification limit RSU, a minimum slope RS0, and a maximum slope RS1 for being used as modification factors of a shift-pattern according to a slope.

Further, the memory 460 stores variable values including an initial release-duty Dsr, a ramp-control slope dDr, and a high-holding duty Dcr for being used as control variables for controlling a release-element in a kick-down shift, and also stores variable values including a low-holding duty Da and a transition duty De for being used as control variables for controlling an apply-element in the kick-down shift.

Detailed descriptions of functions of the variables are omitted because they are the same as already described in the description of the related art.

Figure 5:
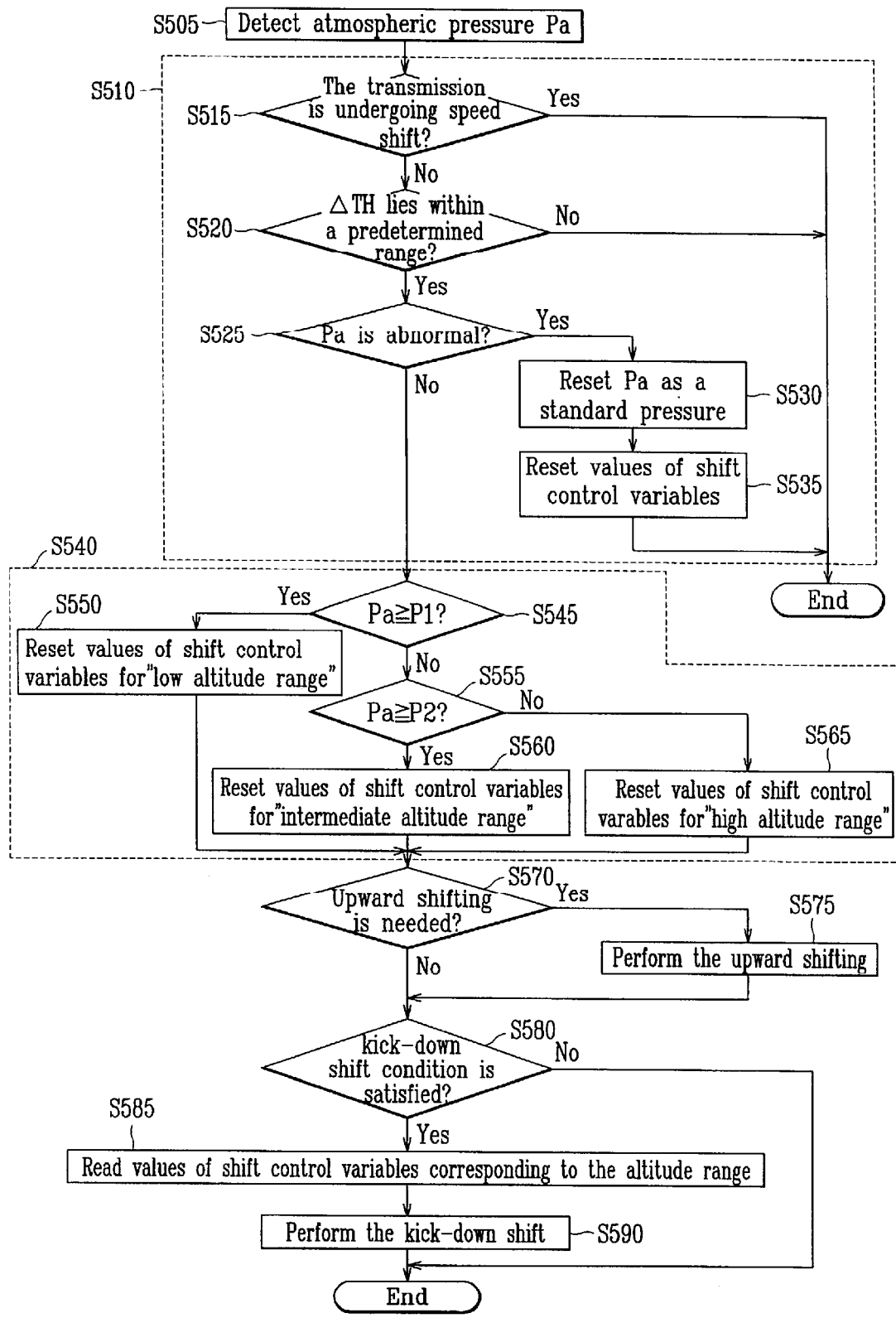
FIG. 5 is a flowchart of a shift control method according to a preferred embodiment of the present invention.

A shift control method for an automatic transmission according to a preferred embodiment is hereinafter described in detail with reference to FIG. 5.

Firstly, the TCU 450 detects an atmospheric pressure Pa at step S505. At step S505, the TCU 450 can detect the atmospheric pressure by receiving a correspondent signal from the atmospheric pressure detector 430 of the driving-state detecting unit 400, or by calculating the atmospheric pressure based on a correspondent signal from a MAP sensor included for a vehicle measuring a mass of the inducted air by a MAP method, or by receiving an atmospheric pressure signal from a control unit if the atmospheric pressure detector 430 includes the control unit for controlling other equipment such as an engine of the vehicle.

Subsequently the TCU 450 determines whether an atmospheric pressure applying condition is satisfied at step S510. The atmospheric pressure applying condition is a predetermined condition for being used to determine whether the detected atmospheric pressure Pa is applied in a shift control of the automatic transmission.

In order to determine whether the atmospheric pressure applying condition is satisfied, the TCU 450 determines whether the transmission is undergoing shifting at step S515.

Whether the transmission is undergoing shifting or not is determined upon whether the actuator unit 470 is under shift operations, that is, upon whether the TCU 450 is sending shift-control signals to the actuator unit 470.

If it is determined that the transmission is undergoing shifting at step S515, the shift control method according to the present invention terminates, and if it is determined that the transmission is not undergoing shifting, the TCU 450 determines whether a change rate ΔTH of the throttle valve open-angle TH lies within a predetermined range of a throttle valve open-angle change rate at step S520.

If is determined that the change rate ΔTH is not within the predetermined range at step S520, the shift control method according to the present invention terminates because the detected value of the atmospheric pressure detector 430 may have a significant error if the throttle valve open-angle TH varies rapidly.

Therefore, the predetermined range of the throttle valve open-angle change rate may be set as any range in which the atmospheric pressure detector 430 does not produce significant error.

If the change rate ΔTH is determined to be within the predetermined range at step S520, the TCU 450 determines whether the detected atmospheric pressure Pa is abnormal at step S525.

The detected atmospheric pressure Pa is determined to be abnormal when an error exists in a communication line between the TCU 450 and the atmospheric pressure detector 430, or when the atmospheric pressure detector 430 is determined to be malfunctioning. The error in the communication line between the TCU 450 and the atmospheric pressure detector 430 can be detected by any method of the prior art for detecting an error of a communication line, and the malfunctioning of the atmospheric pressure detector 430 can be monitored by any method known as a prior art.

When the detected atmospheric pressure Pa is determined to be abnormal at step S525, the TCU 450 resets the value of the detected atmospheric pressure Pa as a predetermined standard pressure at step S530 and resets values of the shift control variables according to the predetermined standard pressure at step S535, and subsequently the shift control method of the present invention terminates. The predetermined standard pressure is defined, for example, as 760 mmHg, an average atmospheric pressure at sea level, and the resetting values of the shift control variables at step S535 can be performed in the same way as resetting values of the shift control variables at step S540.

When the detected atmospheric pressure Pa is determined as not being abnormal at step S525, the TCU 450 resets values of the shift control variables based on the detected atmospheric pressure Pa at step S540.

In step S540, the values of the shift control variables are reset to be appropriate for the extant atmospheric pressure Pa within a predetermined range, the correspondent atmospheric pressure range being selected from a plurality of atmospheric pressure ranges formed on the basis of a plurality of predetermined reference atmospheric pressures.

The shift control variables of which the values are reset include a modification limit RSU for defining a maximum amount of a modification of an upward shift-pattern, a minimum slope RS0 for modifying the upward shift-pattern, and a maximum slope RS1 at which the upward shift pattern is modified by the modification limit RSU.

Further, the shift control variables of which the values are reset include an initial release-duty Dsr for suddenly lowering a release duty for hydraulic pressure supplied to a release-element at a moment that shifting begins, a ramp-control slope dDr for gradually decreasing the release duty for the release-element from the initial release-duty Dsr, a high-holding duty Dcr for holding duty at a higher lever than a final duty of the ramp-control, a low-holding duty Da for holding a low level pressure to reduce an engaging shock of an apply-element, and a transition duty De for supplying sufficient hydraulic pressure to prevent slip of the apply-element.

The step S540 of resetting values of the shift control variables is described in more detail hereinafter.

The TCU 450 stores a first reference pressure P1 and a second reference pressures P2 in the memory 460 as the plurality of predetermined reference atmospheric pressures.

Therefore, a whole atmospheric pressure range is divided, by the first and second reference pressures P1 and P2, into three ranges of a first range wherein the atmospheric pressure is larger than or equal to the first reference pressure P1, which is referred to as "low altitude range" hereinafter, a second range wherein the atmospheric pressure is less than the first reference pressure P1 but larger than or equal to the second reference pressure P2, which is referred to as "intermediate altitude range" hereinafter, and a third range wherein the atmospheric pressure is less than the second reference pressure P2, which is referred to as "high altitude range" hereinafter.

For example, the first reference pressure P1 is predetermined to be 642.41 mmHg, a pressure lower than an average pressure at sea level, and the second reference pressure P2 is predetermined to be 535.11 mmHg, less than the first reference pressure by 107.3 mmHg.

The memory 460 of the TCU 450 includes a register to store a value denoting which ranges the detected atmospheric pressure Pa corresponds to, and the register stores a value denoting one of the "high altitude range", the "intermediate altitude range", and the "low altitude range" in the memory.

Moreover, values of the shift control variables for each of the three atmospheric pressure ranges are stored in the memory 460. That is, the values of the shift control variables are stored separately according to the "high altitude range", the "intermediate altitude range", and the "low altitude range".

Therefore, the TCU determines whether the detected atmospheric pressure Pa is larger than or equal to the first reference pressure P1 at step S545, and stores a value denoting the "low altitude range" in the register at step S550 if the detected atmospheric pressure Pa is larger than or equal to the first reference pressure P1.

If the detected atmospheric pressure Pa is determined to be less than the first reference pressure P1 at step S545, the TCU determines whether the detected atmospheric pressure Pa is larger than or equal to the second reference pressure at step S555, and stores a value denoting the "intermediate altitude range" in the register at step S560 if the detected atmospheric pressure Pa is determined to be larger than or equal to the second reference pressure P2 step S555.

If the detected atmospheric pressure Pa is determined to be less than the second reference pressure P2 at step S555, the TCU 450 stores a value denoting the "high altitude range" in the register at step S565.

Therefore, values of the shift control variables are reset to values of the shift control variables of a correspondent atmospheric pressure range in which the detected atmospheric pressure Pa lies, the correspondent atmospheric pressure range being selected from the plurality of atmospheric pressure ranges of the "high altitude range", the "intermediate altitude range", and the "low altitude range", formed on the basis of a plurality of predetermined reference atmospheric pressures P1 and P2.

When values of the shift control variables are reset based on the detected atmospheric pressure Pa at step S540, the TCU 450 determines, on the basis of the reset values, whether an upward shifting speed is needed at step S570.

If the vehicle driving altitude is changed, for example, from the "low altitude range" to the "intermediate altitude range", the values to be used for the shift control variables are also changed, and therefore, the amount of modification in an upward shift-pattern on a slope is also changed because the shift control variables of which the values are changed include shift control variables related to the modification of the upward shift-pattern. Accordingly, occurrence of the lift-foot-up shift is changed according to the vehicle driving altitude.

If it is determined that an upward shifting speed is needed at step S570, the TCU 450 performs the upward shifting according to a predetermined up-shifting method of the prior art at step S575.

The TCU 450 also determines whether a kick-down shift condition is satisfied at step S580. Whether the kick-down shift condition is satisfied may be determined upon whether a change of the throttle valve open-angle causes the vehicle driving state to cross over the threshold line of a downward shift-pattern.

If the kick-down shift condition is determined not being satisfied at step S580, the shift control method according to the present invention terminates.

If the kick-down shift condition is determined to be satisfied at step S580, the TCU 450 performs an accordingly determined downshift based on the reset values of the shift control variables at steps of S585 and S590.

For the accordingly determined downshift, the TCU 450 reads values from the register to find which altitude range the vehicle is being driven in and reads values of the shift control variables corresponding to the found altitude range at step S585, and performs the kick-down shift control based on the read values of the shift control variables at step S590.

As described above, according to the preferred, embodiment of the present invention, relative hydraulic pressure affected by changes of engine power caused by changes of vehicle driving altitude is considered for kick-down shifting and therefore shift shock in kick-down shifting at a high altitude is reduced.

Furthermore, an amount of modification of an upward shift-pattern on a slope is also dependent on the vehicle driving altitude and therefore frequent shifting on a slope in a high-altitude is prevented, which increases durability of an automatic transmission and provides more stability in a driving performance of a vehicle.

While the present invention has been described in detail with reference to the preferred embodiment, those skilled in the art will appreciate that various modifications and substitutions can be made thereto without departing from the sprit and scope of the present invention as set forth in the appended claims.

What is claimed is:

1. A shift control method for an automatic transmission of a vehicle comprising:

detecting atmospheric pressure;

determining whether a predetermined atmospheric pressure applying condition is satisfied; and resetting values of shift control variables based on the detected atmospheric pressure when the predetermined atmospheric pressure applying condition is satisfied the shift control variables being variables for duty control of hydraulic pressure for friction elements of the automatic transmission, wherein the shift control variables of which the values are reset comprise at least one of:

an initial release-duty (Dsr) for suddenly lowering a release duty for hydraulic pressure supplied to a release-element, a ramp-control slope (dDr) for gradually decreasing the release duty for the release-element from the initial release-duty (Dsr), and a high-holding duty (Dcr) for holding duty at a higher lever than a final duty of the ramp-control.

2. The shift control method of claim 1 further comprising:

determining whether a predetermined kick-down shift condition is satisfied; and performing down-shift based on the reset values of shift control variables when the kick-down shift condition is satisfied.

3. The shift control method of claim 1 wherein the shift control variables of which the values are reset further comprise at least one of:

a low-holding duty (Da) for holding a low level pressure to reduce an engaging shock of an apply-element, and a transition duty (De) for supplying sufficient hydraulic pressure to prevent slip of the apply-element.

4. A shift control method for an automatic transmission of a vehicle comprising:

detecting atmospheric pressure;

determining whether a predetermined atmospheric pressure applying condition is satisfied; and resetting values of shift control variables based on the detected atmospheric pressure when the predetermined atmospheric pressure applying condition is satisfied the shift control variables being variables for duty control of hydraulic pressure for friction elements of the automatic transmission wherein:

the atmospheric pressure applying condition includes the automatic transmission not undergoing shifting, and the determining whether the predetermined atmospheric pressure applying condition is satisfied determines that the predetermined atmospheric pressure applying condition is not satisfied if the automatic transmission is undergoing shifting.

5. A shift control method for an automatic transmission of a vehicle comprising:

detecting atmospheric pressure:

determining whether a predetermined atmospheric pressure applying condition is satisfied; and resetting values of shift control variables based on the detected atmospheric pressure when the predetermined atmospheric pressure applying condition is satisfied the shift control variables being variables for duty control of hydraulic pressure for friction elements of the automatic transmission wherein:

the atmospheric pressure applying condition includes a change rate of a throttle valve open-angle being within a predetermined change rate range, and the determining whether the predetermined atmospheric pressure applying condition is satisfied determines that the predetermined atmospheric pressure applying condition is not satisfied if the change rate of the throttle valve open-angle is out of the predetermined change rate range.

6. A shift control method for an automatic transmission of a vehicle comprising:

detecting atmospheric pressure;

determining whether a predetermined atmospheric pressure applying condition is satisfied; and resetting values of shift control variables based on the detected atmospheric pressure when the predetermined atmospheric pressure applying condition is satisfied the shift control variables being variables for duty control of hydraulic pressure for friction elements of the automatic transmission wherein:

the atmospheric pressure applying condition includes the detected atmospheric pressure not being abnormal, the determining whether the predetermined atmospheric pressure applying condition is satisfied determines that the predetermined atmospheric pressure applying condition is satisfied only if the detected atmospheric pressure is not abnormal, and the determining whether the predetermined atmospheric pressure applying condition is satisfied comprises resetting the detected atmospheric pressure as a predetermined atmospheric pressure if the detected atmospheric pressure is abnormal.

7. The shift control method of claim 6 wherein the detected atmospheric pressure is determined to be abnormal when an error exists in a communication line between a transmission control unit and an atmospheric pressure detector, or when the atmospheric pressure detector is determined to be malfunctioning.

* * * * *